US009285643B2

(12) United States Patent
Song et al.

(10) Patent No.: US 9,285,643 B2
(45) Date of Patent: Mar. 15, 2016

(54) LIQUID CRYSTAL DISPLAY

(71) Applicant: Samsung Display Co., Ltd., Yongin, Gyeonggi-Do (KR)

(72) Inventors: Min-Chul Song, Cheonan-si (KR); Sung Man Kim, Seoul (KR); Jun Ho Song, Seongnam-si (KR); Hwa Yeul Oh, Seoul (KR); Yu Jin Lee, Asan-si (KR); Young Je Cho, Asan-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 196 days.

(21) Appl. No.: 14/187,863

(22) Filed: Feb. 24, 2014

(65) Prior Publication Data

US 2015/0061986 A1  Mar. 5, 2015

(30) Foreign Application Priority Data

Sep. 5, 2013  (KR) .................. 10-2013-0106750

(51) Int. Cl.
*G09G 3/36* (2006.01)
*G02F 1/1362* (2006.01)
*G02F 1/1343* (2006.01)
*G02F 1/1368* (2006.01)

(52) U.S. Cl.
CPC ........ *G02F 1/136286* (2013.01); *G02F 1/1368* (2013.01); *G02F 1/134363* (2013.01)

(58) Field of Classification Search
CPC .............. G09G 3/36–3/3696; G02F 1/136286; G02F 1/134363; G02F 1/1368
See application file for complete search history.

(56) References Cited

U.S. PATENT DOCUMENTS

| 6,972,824 | B2 | 12/2005 | Masutani et al. |
| 7,352,432 | B2 | 4/2008 | Yokogawa et al. |
| 2007/0097052 | A1* | 5/2007 | Sasaki ................. G09G 3/3648 345/92 |

FOREIGN PATENT DOCUMENTS

| KR | 1020050020319 A | 3/2005 |
| KR | 1020060131244 A | 12/2006 |
| KR | 1020110077254 A | 7/2011 |
| KR | 1020120076181 A | 7/2012 |

* cited by examiner

Primary Examiner — Yong H Sim
(74) Attorney, Agent, or Firm — Cantor Colburn LLP

(57) ABSTRACT

A liquid crystal display includes pixels which is disposed in row and column directions, respectively includes pixel electrodes, and arranged along a first pixel column to a sixth pixel column, gate lines including pairs of two adjacent gate lines for each pixel row in the row direction, data lines including a first data line at a left side of the first pixel column, a second data line between the second and third pixel columns, a third data line between the fourth and fifth pixel columns, and a fourth data line at a right side of the sixth pixel column; and common voltage lines including a first common voltage line between the first and second pixel columns, a second common voltage line between the third and fourth pixel columns, and a third common voltage line between the fifth and sixth pixel columns.

15 Claims, 10 Drawing Sheets

LIQUID CRYSTAL DISPLAY

This application claims priority to Korean Patent Application No. 10-2013-0106750 filed on Sep. 5, 2013, and all the benefits accruing therefrom under 35 U.S.C. §119, the entire contents of which are incorporated herein by reference.

BACKGROUND (a) Field

The invention relates to a liquid crystal display.

(b) Description of the Related Art

A liquid crystal display ("LCD") is one of flat panel displays which are currently being widely used, and includes two sheets of display panels in which field generating electrodes such as a pixel electrode and a common electrode are formed, a liquid crystal layer disposed therebetween, a data driver which supplies a data voltage to the display panel, a gate driver which supplies a gate signal to the display panel, a signal controller which controls the data driver and the gate driver, and the like. The LCD includes a plurality of signal lines, such as gate lines and data lines, which control switching elements connected to each of the pixel electrodes to apply a data voltage to the pixel electrodes.

SUMMARY

In a liquid crystal display ("LCD") in which a pixel electrode and a common electrode generating an electric field are positioned in one display panel including a switching element, a signal delay of a common voltage applied to the common electrode may be generated. To prevent the signal delay of the common voltage, when providing a common voltage line transmitting the common voltage to the pixel area, an aperture ratio of the LCD is deteriorated.

The invention provides an LCD with reduced delay of a signal applied to a common electrode without a deterioration of an aperture ratio.

The invention also provides an LCD driven with low power consumption.

An LCD according to an exemplary embodiment of the invention includes a plurality of pixels which is disposed in row and column directions, and respectively includes a plurality of pixel electrodes, the plurality of pixel electrodes arranged in a first pixel column to a sixth pixel column, a plurality of gate lines extending in the row direction, and including pairs of adjacent gate lines respectively corresponding to one for each pixel row in the row direction, a plurality of data lines extending in the column direction, and including a first data line at a left side of the first pixel column, a second data line between the second and third pixel columns, a third data line between the fourth and fifth pixel columns, and a fourth data line at a right side of the sixth pixel column, and a plurality of common voltage lines extending in the column direction, and including a first common voltage line between the first and second pixel columns, a second common voltage line between the third and fourth pixel columns, and a third common voltage line between the fifth and sixth pixel columns, where each data line of the plurality of data lines is connected to two pixel electrodes adjacent in the row direction among the plurality of pixel electrodes on a first side of the data line, in an odd-numbered pixel row and is connected to two pixel electrodes adjacent in the row direction among the plurality of pixel electrodes on a second side opposing the first side of the data line, in an even-numbered pixel row directly adjacent to the odd-numbered pixel row, the first common voltage line is disconnected between the odd-numbered pixel row and the even-numbered pixel row disposed directly thereunder, in the column direction, and the second and third common voltage lines are disconnected between the even-numbered pixel row and another odd-numbered pixel row disposed directly thereunder, in the column direction.

In an exemplary embodiment, the plurality of data lines and the plurality of common voltage lines may be positioned in and/or on a same layer and include a same material.

In an exemplary embodiment, the plurality of pixels may further include a switching element respectively connected to the plurality of pixel electrodes, the switching element may be positioned between the pixel rows in which a common voltage line of the plurality of common voltage lines is disconnected, such that the switching element may cross an imaginary extension line of the common voltage line.

In an exemplary embodiment, two switching elements may be positioned between the pixel rows at which the common voltage line is disconnected.

In an exemplary embodiment, the switching element may be included in the pixel electrode positioned relatively far from a data line of the plurality of data lines among two pixel electrodes in a pixel row of the plurality of pixel rows connected to the data line.

In an exemplary embodiment, the plurality of pixels may further include a plurality of common electrodes respectively overlapping the plurality of pixel electrodes, and an insulating layer between the common and pixel electrodes, and the plurality of gate lines, the plurality of data lines, the plurality of common voltage lines, the plurality of pixel electrodes and the plurality of common electrodes may be positioned on a same substrate, and a common electrode may be positioned to overlap the pixel electrode with an insulating layer therebetween.

In an exemplary embodiment, the liquid crystal display may further include a common electrode transverse connection and a common electrode longitudinal connection in a same layer as the common electrodes, and common electrodes adjacent in the row direction may be connected to each other by the common electrode transverse and longitudinal connections.

In an exemplary embodiment, the common electrode transverse connection may be positioned on the data line of the plurality of data lines and connect the common electrodes adjacent in the row direction and respectively positioned at the first and second sides of the data line, and the common electrode longitudinal connection may overlap a common voltage line of the plurality of common voltage lines, and connect the common electrodes adjacent in the row direction and respectively positioned at opposing sides of the common voltage line.

In an exemplary embodiment, the plurality of pixels may further include a plurality of first switching elements which is respectively connected to the plurality of pixel electrodes of the odd-numbered pixel row may be positioned at a left upper side, a left lower side, a left lower side, a left upper side, a left lower side, and a left upper side of the plurality of pixel electrodes in the first to sixth pixel columns of the odd-numbered pixel row, and may be repeated in the row direction. In addition, the plurality of pixels further includes a plurality of second switching elements which is respectively connected to the plurality of pixel electrodes of the even-numbered pixel row may be positioned in a right upper side, a right lower side, a right lower side, a right upper side, a right lower side, and a right upper side of the plurality of pixel electrodes in the first to sixth pixel columns of the even-numbered pixel row, and may be repeated in the row direction.

In an exemplary embodiment, in the odd-numbered pixel row, the two pixel electrodes adjacent to each other may provide a pair of pixel electrodes and be connected to the data line positioned at a left or a right side thereof, and in the even-numbered pixel row, the two pixel electrodes adjacent to each other may provide a pair of pixel electrodes and be connected to the data line positioned at the right or left side thereof, respectively.

In an exemplary embodiment, in the odd-numbered pixel row, the first and fourth data lines may be connected to the pixel electrode closer thereto among the two adjacent pixel electrodes connected thereto, at an upper side of the pixel electrode, and may be connected to the pixel electrode farther therefrom among the two adjacent pixel electrodes connected thereto, at a lower side of the pixel electrode, the second and third data lines may be connected to the pixel electrode closer thereto among the two adjacent pixel electrodes connected thereto, at the lower side of the pixel electrode and may be connected to the pixel electrode therefrom among the two adjacent pixel electrodes connected thereto, at the upper side of the pixel electrode, and these connections may be repeated in the row direction.

In an exemplary embodiment, in the even-numbered pixel row, the second data line may be connected to the pixel electrode closer thereto among the two adjacent pixel electrodes connected thereto, at the lower side of the pixel electrode, and may be connected to the electrode farther therefrom among the two adjacent pixel electrodes connected thereto, at the upper side of the pixel electrode the third and fourth data lines may be connected to the pixel electrode closer thereto among the two adjacent pixel electrodes connected thereto, at the upper side of the pixel electrode and may be connected to the pixel electrode farther therefrom among the two adjacent pixel electrodes connected thereto, at the lower side, and these connections may be repeated in the row direction.

In an exemplary embodiment, disconnected portions of the plurality of common voltage lines may be connected to each other by a connecting member in a different layer than the plurality of common voltage lines.

In an exemplary embodiment, the liquid crystal display may further include a passivation layer where the plurality of pixels further includes a switching element respectively connected to the plurality of pixel electrodes, and the connecting member may overlap a switching element and the plurality of gate lines via the passivation layer.

In an exemplary embodiment, the liquid crystal display may further include a common electrode which overlaps the plurality of pixel electrodes where the connecting member may include a same material as that of the common electrode.

The LCD according to the invention may effectively reduce a delay of the signal applied to the common electrode without deterioration of an aperture ratio, and low power consumption driving is possible.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
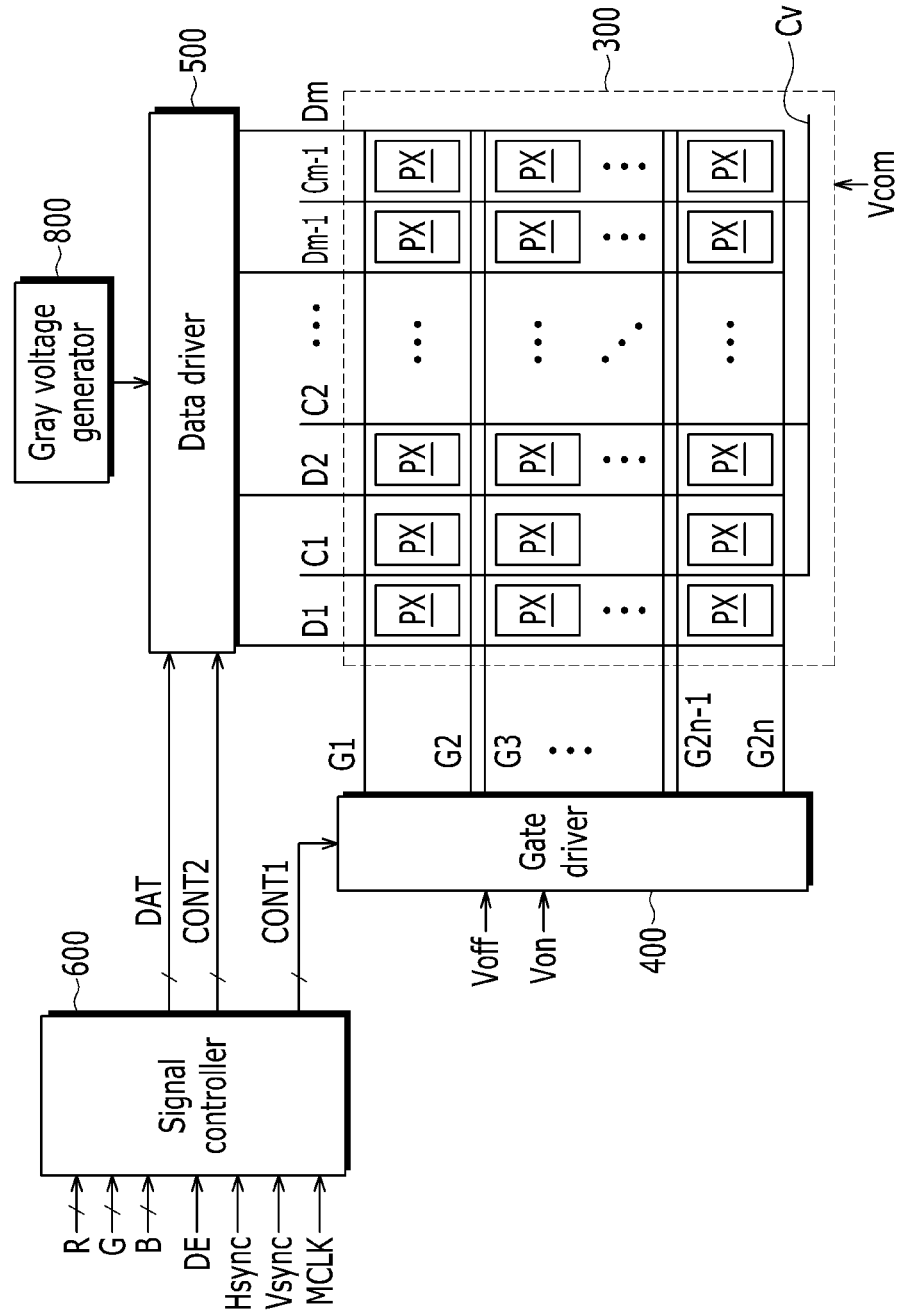
FIG. 1 is a block diagram of an exemplary embodiment of a liquid crystal display ("LCD") according to the invention.

In the following detailed description, only certain exemplary embodiments of the invention have been shown and described, simply by way of illustration. As those skilled in the art would realize, the described exemplary embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A liquid crystal display ("LCD") according to an exemplary embodiment of the invention will now be described with reference to accompanying drawings.

Figure 2:
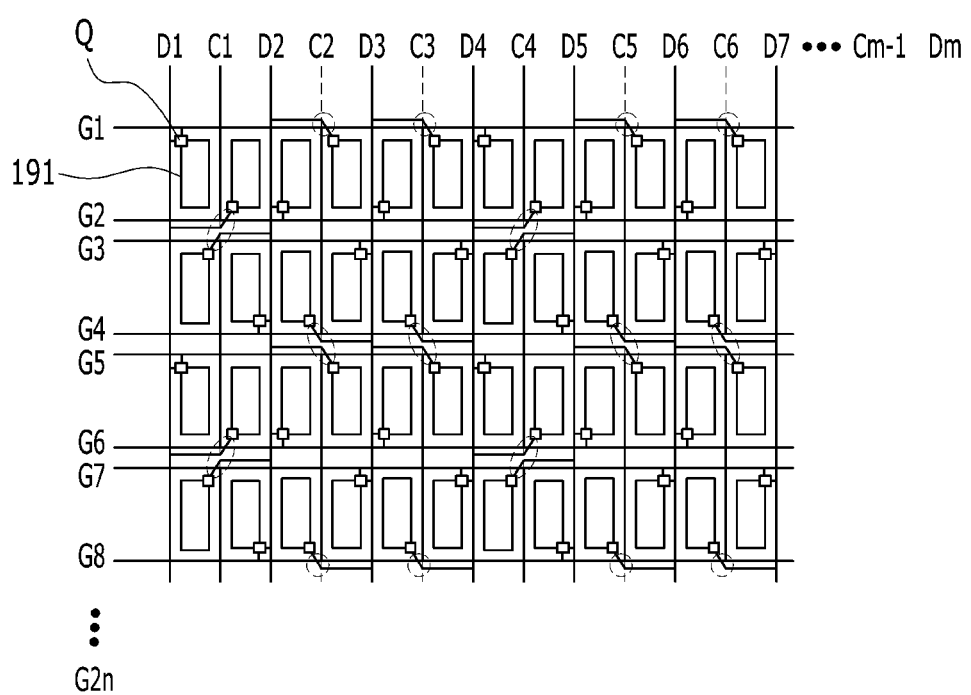
FIG. 2 is a view of an exemplary embodiment of a pixel, a switching element, and a connection relationship of a signal line in an LCD according to the invention.

FIG. 1 is a block diagram of an LCD according to an exemplary embodiment of the invention, and FIG. 2 is a view of a pixel, a switching element, and a connection relationship of a signal line in an LCD according to an exemplary embodiment of the invention.

As shown in FIG. 1, an LCD according to an exemplary embodiment of the invention includes an LCD panel 300, a gate driver 400 and a data driver 500 connected thereto, a gray voltage generator 800 connected to the data driver 500, and a signal controller 600 controlling them.

In an exemplary embodiment, the signal controller 600 is supplied with input image signals R, G and B and input control signals controlling the display thereof from an external graphics controller (not shown). The input image signals R, G and B contains luminance information of each pixel PX, and the luminance has a predetermined number of, for example, 1024(=2¹⁰), 256(=2⁸) or 64(=2⁶) grays. The input control signals include a vertical synchronization signal Vsync, a horizontal synchronization signal Hsync, a main clock MCLK, and a data enable signal DE, etc.

The signal controller 600 processes the input image signals R, G, and B to be suitable for the operating condition of the liquid crystal panel assembly 300 and generates gate control signals CONT1 for controlling the gate driver 400 and data control signals CONT2 for controlling the data driver 500, as shown in FIG. 1.

Responding to the data control signals CONT2 from the signal controller 600, the data driver 500 receives digital image signals DAT for a row of pixels PX, converts the digital image signals DAT into analog data voltages selected from the gray voltages from the gray voltage generator 800, and then applies the analog data voltages to the corresponding data lines.

The vertical synchronization signal Vsync divides the input image signals R, G, and B by frames, that is, by images. The horizontal synchronization signal Hsync divides input image signals R, G, and B for a frame into several packets. The input image signals R, G, and B for pixels of the respective rows are divided by the horizontal synchronization signal Hsync, for example.

The LCD panel 300 includes a plurality of signal lines G1-G2n, D1-Dm, C1-Cm−1, and Cv, and a plurality of pixels PX connected thereto and arranged substantially in a matrix.

The signal lines G1-G2n, D1-Dm, C1-Cm−1 and Cv include a plurality of gate lines G1 to G2n for transmitting gate signals (also referred to as "scanning signals"), a plurality of data lines D1 to Dm for transmitting data signals, common voltage lines C1-Cm−1 for transmitting a common voltage, and a common voltage line connection Cv. The gate lines G1 to G2n extend substantially in a row direction so as to be parallel to each other, and the data lines D1 to Dm extend substantially in a column direction so as to be parallel to each other. The common voltage lines C1-Cm−1 extend parallel to the data lines D1-Dm, and the common voltage line connection Cv connects a plurality of common voltage lines C1-Cm−1 and extends parallel to the gate lines G1-G2n.

In detail, referring to connection of the signal lines, each row of pixel electrodes 191 (refers FIG. 2) is disposed between a pair of two adjacent gate lines among gate lines G1-G2n, and one data line among the data lines D1-Dm is disposed between two adjacent columns of pixel electrodes 191 (i.e., between a pair of two adjacent pixel columns among a first pixel column to a sixth pixel column sequentially from a leftmost pixel column). In other words, a pair of gate lines G1 and G2, G3 and G4, . . . are respectively disposed above and below each pixel row, and one data line D1, D2, D3, D4, . . . is disposed between a pair of two adjacent pixel columns (i.e., between a pair of the first and second pixel columns and a pair of the third and fourth pixel columns, between a pair of the third and fourth pixel columns and a pair of the fifth and sixth pixel columns, between a pair of the fifth and sixth pixel columns and a pair of the seventh and eighth pixel columns, . . . ). However, among the data lines D1-Dm, the leftmost data line D1 and the rightmost data line Dm are not disposed between a pair of two adjacent pixel columns, but are respectively disposed at a left side and a right side of edge pixel columns, so that one data line D1-Dm is designed to be connected to two pixel electrodes 191 (refers to FIG. 2) for each pixel row.

The connection between the gate lines G1-G2n and the data lines D1-Dm, and the pixel electrode 191 will now be described.

Firstly, referring to an exemplary embodiment of the arrangement of the switching element Q for each pixel electrode shown in FIG. 2, the switching element Q connected to the pixel electrode of the odd-numbered pixel rows is disposed on a left upper side, a left lower side, a left lower side, a left upper side, a left lower side, and a left upper side of each pixel electrode from the first pixel column to the sixth pixel column. The switching element Q connected to the pixel electrode of the even-numbered pixel rows is disposed on the right upper side, the right lower side, the right lower side, the right upper side, the right lower side, and the right upper side of each pixel electrode from the first pixel column to the sixth pixel column. Accordingly, whether or not the switching element Q connected to the pixel electrode of the odd-numbered pixel row and the switching element Q connected to the pixel electrode of the even-numbered pixel row are positioned on the left side of the pixel electrode (i.e., the case of the odd-numbered pixel rows) or are positioned on the right side (i.e., the case of the even-numbered pixel rows), an upper and lower position relationship for the pixel electrode of each pixel column is the same (i.e., the upper side, the lower side, the lower side, the upper side, the lower side, the upper side from the first pixel column to the sixth pixel column). Positioning the switching element Q on the left side or the right side of the pixel electrode 191 reduces a distance from the data lines D1-Dm to be connected, but it is not limited to positioning on the left side and the right side.

The arrangement of the switching element Q for the pixel electrode is repeated by a 2 row×6 column unit (i.e., a 12 pixel unit). In the illustrated exemplary embodiment in FIG. 2, the arrangement of the switching element Q for each pixel disposed in a rectangle defined by the first gate line G1, the fourth gate line G4, the first data line D1, and the fourth data line D4 is the same as the arrangement of the switching element Q for each pixel disposed in the rectangle defined by the first gate line G1, the fourth gate line G4, the fourth data line D4, and the seventh data line D7, for example. Also, this arrangement is the same as the arrangement of the switching element Q for each pixel disposed in the rectangle defined by the fifth gate line G5, the eighth gate line G8, the first data line D1, and the fourth data line D4, and is also the same as the arrangement of the switching element Q for each pixel disposed in the rectangle defined by the fifth gate line G5, the eighth gate line G8, the fourth data line D4, and the seventh data line D7, for example.

The gate lines G1-G2$n$ and the data lines D1-Dm are connected to the pixel electrode 191 based on the arrangement of the switching element Q, and resultantly, the repetition unit of the switching element Q becomes a repetition unit of the pixel.

A plurality of pairs of the gate lines G1-G2$n$ respectively disposed above and below the pixel electrode 191 are connected to the corresponding pixel electrodes 191 through the switching elements Q positioned upward or downward of each pixel electrode 191. In detail, the odd-numbered gate lines G1, G3, . . . are connected to the switching element Q disposed in the first, fourth, and sixth pixel columns and the even-numbered gate lines G2, G4, . . . are connected to the switching element Q disposed in the second, third, and fifth pixel columns. As described above, the arrangement of the switching element Q for the pixel is repeated by the 2 row×6 column unit such that the connection of the gate lines G1, G2, G3, G4, . . . is also repeated by the 2 row×6 column unit.

The data lines D1-Dm are alternately connected to two pixel electrodes of the left side or the right side of the data line through the switching element Q every row. For the connection to the pixel electrode positioned relatively far among two pixel electrodes, the data lines D1-Dm include a horizontal direction extension (which becomes a source electrode of the switching element). In detail, the first and fourth data lines D1 and D4 are connected to two pixel electrodes adjacent to the right side of the corresponding data lines D1 and D4 in the odd-numbered pixel row, and are connected to two pixel electrodes adjacent to the left side of the corresponding data line D4 in the even-numbered pixel row. In the left side or the right side, the first and fourth data lines D1 and D4 are connected to the pixel electrode positioned to be closer through the switching element Q disposed on the upper side of the corresponding pixel electrode, and are connected to the pixel electrode positioned to be farther through the switching element Q disposed on the lower side of the corresponding pixel electrode.

In contrast, the second and third data lines D2 and D3 are connected to two pixels adjacent to the right side of the corresponding data lines D2 and D3 in the odd-numbered pixel row, and are connected to two pixel adjacent to the left side of the corresponding data lines D2 and D3 of the even-numbered pixel row. The second and third data lines D2 and D3 are connected to the pixel electrode to be closer thereto through the switching element Q disposed on the lower side of the corresponding pixel electrode and are connected to the pixel electrode to be farther therefrom through the switching element Q disposed on the upper side of the corresponding pixel electrode. The connection of the data lines D1, D2, D3, D4, . . . is repeated as the 2 row×6 column unit according to the repetition unit of the switching element Q for the pixel.

The arrangement shown in FIG. 2 is one example, and the connection between the pixel electrodes 191 of the odd-numbered pixel row and the even-numbered pixel row and the data lines D1-Dm and the gate lines G1-G2$n$ may be exchanged, and other connection may be realized. Also, the repetition unit is provided as the repetition unit of the pixel connection between the first data line D1 and the fourth data line D4, but the pixel connection between the second data line D2 and the fifth data line D5, or between the third data line D3 and the sixth data line D6, may be provided as the repetition unit. Further, the leftmost data line may be the second data line D2 or the third data line D3, rather than the first data line D1.

According to the connection relationship between the pixel electrode 191, and the data lines D1-Dm and the gate lines G1-G2$n$, the data signal applied to the data lines D1-Dm provides column inversion, but the adjacent pixel rows provide dot inversion. The data signal is driven with the column inversion such that power consumption may be effectively reduced.

The common voltage lines C1-Cm−1 are connected to each other by the common voltage line connection Cv thereby receiving a common voltage from the outside. Like the data lines D1-Dm, one of the common voltage lines C1-Cm−1 is disposed between a pair of pixel columns, and is disposed substantially parallel to the data lines between adjacent pixel columns between which the data lines D1-Dm are not disposed. Differently from the data lines D1-Dm in which each data line is continuously disposed on the entire corresponding pixel column, the common voltage lines C1-Cm−1 are disconnected at a portion that may overlap the horizontal direction extension of the data lines D1-Dm or the switching element Q.

In FIG. 2, a portion indicated by an oval dotted line is a position where the voltage line C1-Cm−1 are disconnected not to overlap the horizontal direction extension of the data lines D1-Dm to the switching element Q. In contrast, the voltage lines C1-Cm−1 are continuously connected at a position where the horizontal direction extension of the data lines D1-Dm to the switching element Q does not overlap with the voltage lines C1-Cm−1. In an exemplary embodiment, in a case of the first common voltage line C1, it is disconnected between the odd-numbered pixel row and the even-numbered pixel row, and the second and third common voltage lines C2 and C3 are disconnected between the even-numbered pixel row and the odd-numbered pixel row disposed directly below the following pixel row. The arrangement and the disconnection of the common voltage lines C1, C2, C3, . . . are repeated by the 2 row×6 column unit according to the repetition unit of the switching element Q for the pixel.

As the common voltage lines C1-Cm−1 are disposed between a pair of pixel columns, the signal delay of the common voltage and a decrease in an aperture ratio due to the common voltage line can be effectively prevented. Also, the common voltage lines C1-Cm−1 are disconnected at the portion that may overlap the horizontal direction extension of the data lines D1-Dm or the switching element Q such that a short-circuit may be effectively prevented although the common voltage line is provided with the same layer as the data line or the source/drain electrode of the switching element. In an exemplary embodiment, the common voltage line is disposed in and/or on the same layer as the data line or the source/drain electrode of the switching element.

Although the common voltage line has the disconnection portion between the upper and lower adjacent pixel rows, one or two common voltage lines among three common voltage lines are not disconnected in one repetition unit between the upper and lower pixel rows such that the application of the common voltage is not interfered with when the common electrodes are connected in the row direction.

Next, a structure of the LCD shown in FIGS. 1 and 2 will be described with reference to FIGS. 3 to 7.

Figure 3:
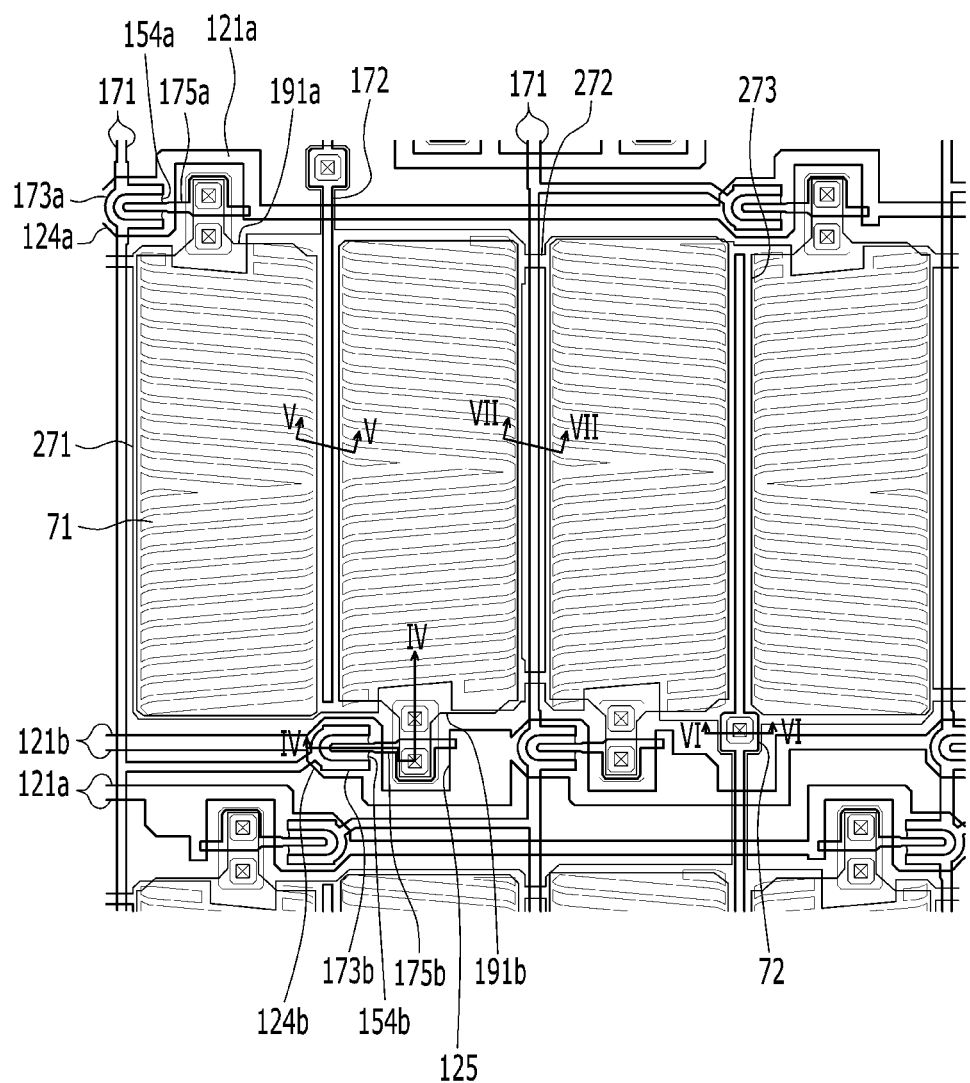
FIG. 3 is a plan view of an exemplary embodiment of a pixel in an LCD according to the invention.
Figure 4:
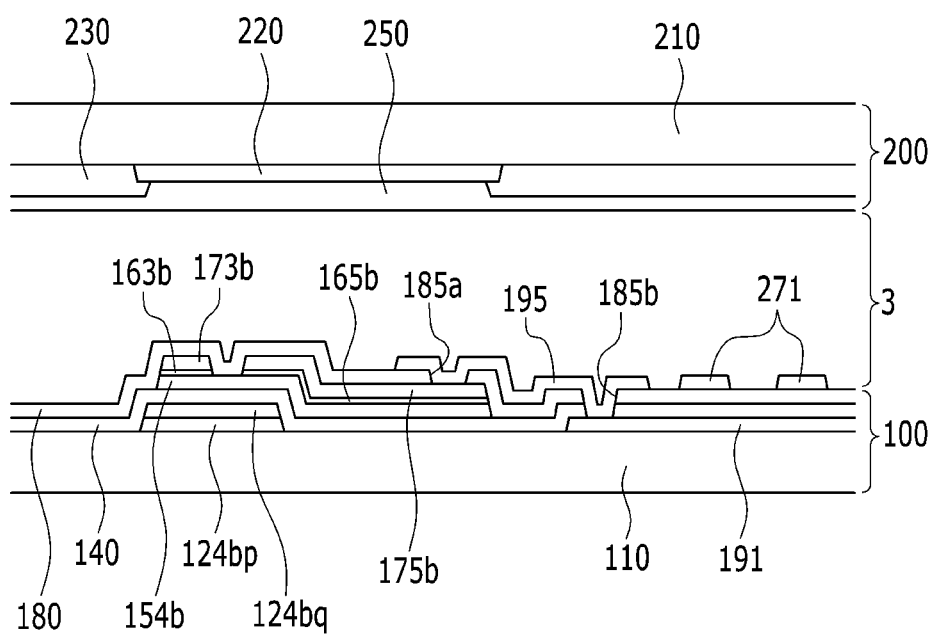
FIG. 4 is a cross-sectional view of the LCD of FIG. 3 taken along line IV-IV.
Figure 5:
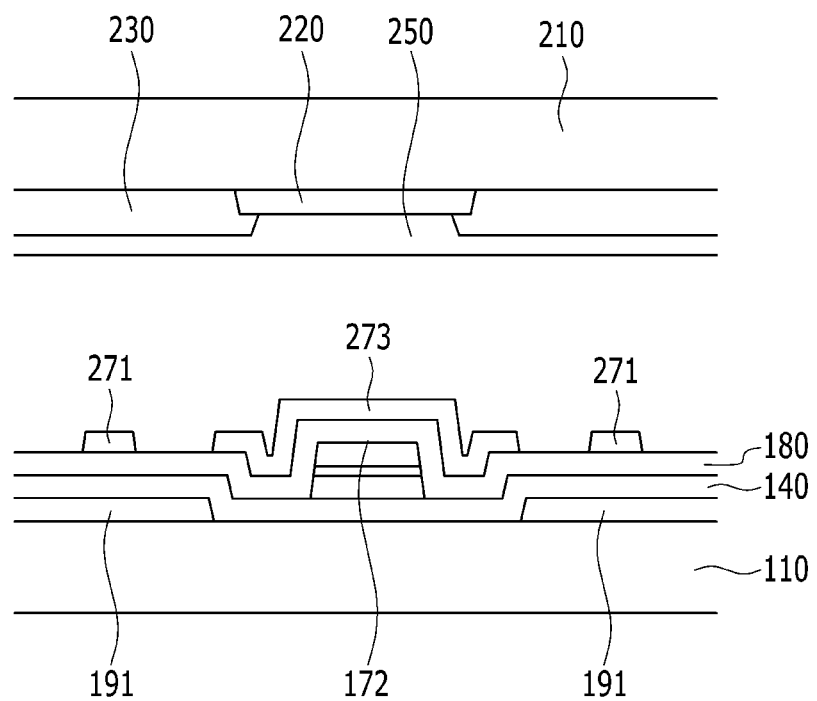
FIG. 5 is a cross-sectional view of the LCD of FIG. 3 taken along line V-V.
Figure 6:
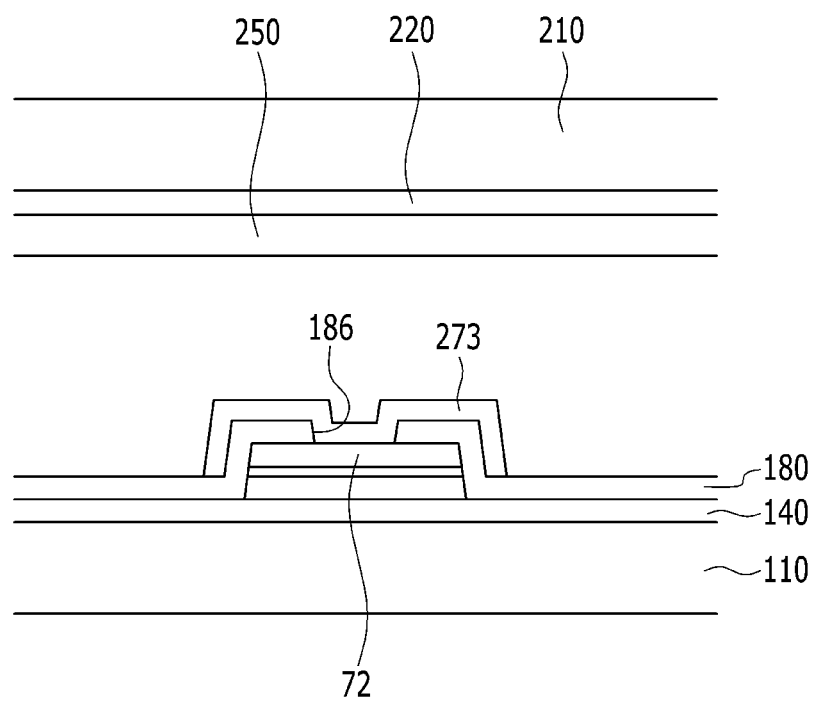
FIG. 6 is a cross-sectional view of the LCD of FIG. 3 taken along line VI-VI.
Figure 7:
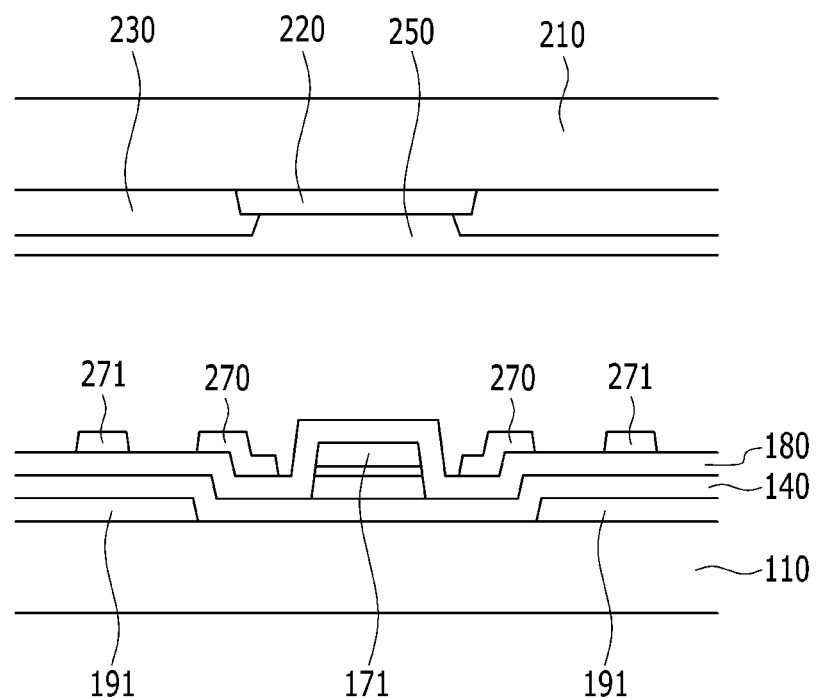
FIG. 7 is a cross-sectional view of the LCD of FIG. 3 taken along line VII-VII.

FIG. 3 is a plan view of a pixel in an LCD according to an exemplary embodiment of the invention, FIG. 4 is a cross-sectional view of the LCD of FIG. 3 taken along line IV-IV, FIG. 5 is a cross-sectional view of the LCD of FIG. 3 taken along line V-V, FIG. 6 is a cross-sectional view of the LCD of FIG. 3 taken along line VI-VI, and FIG. 7 is a cross-sectional view of the LCD of FIG. 3 taken along line VII-VII.

Referring to FIGS. 3 to 8, the LCD according to an exemplary embodiment of the invention includes a lower panel 100 and an upper panel 200, and a liquid crystal layer 3 disposed between the two display panels 100 and 200.

Firstly, the lower panel 100 will be described.

A plurality of gate lines 121a and 121b are disposed on a first substrate 110 including a transparent insulator such as glass or plastic, for example.

The gate lines 121a and 121b substantially extend in a transverse direction, and portions of the gate lines 121a and 121b provide gate electrodes 124a and 124b, respectively. Two gate lines 121a and 121b are provided as a pair via the pixel electrode 191 interposed therebetween. The gate lines 121a and 121b may include expansions 125. The gate lines 121a and 121b include end portions (not shown) for connection with another layer or an external driving circuit.

The gate lines 121a and 121b include a dual-layer structure a lower layer 124ap/124bp and an upper layer 124aq/124bq, and the lower layer 124ap/124bp of the gate line is disposed in and/or on the same layer as the pixel electrode 191 and may include a transparent conductive material such as polycrystalline, polycrystalline, monocrystalline, or amorphous indium tin oxide ("ITO") or indium zinc oxide ("IZO"), for example. The upper layer 124aq/124bq of the gate line may include a metal having lower resistivity to effectively reduce a signal delay or a voltage drop, for example, a copper-based metal such as copper (Cu) or copper alloys. Also, the upper layer 124aq/124bq of the gate line may include a metal such as an aluminum-based metal of aluminum (Al) or aluminum alloys, a silver-based metal of silver (Ag) or silver alloys, a molybdenum-based metal of molybdenum (Mo) or molybdenum alloys, chromium (Cr), tantalum (Ta), and titanium (Ti), for example.

The pixel electrode 191 is provided with the same layer as the lower layer 124ap/124bp of the gate lines 121a and 121b. In an exemplary embodiment, the pixel electrode 191 is disposed in and/or on the same layer as the lower layer 124ap/124bp of the gate lines 121a and 121b. In an exemplary embodiment, the pixel electrode 191 has a planar shape, that is, a plate shape, and is disposed in one pixel area. In an exemplary embodiment, the pixel electrode 191 includes the transparent conductive material such as ITO and IZO like the lower layer 124ap/124bp of the gate line.

A gate insulating layer 140 including a silicon nitride ($SiN_x$) is disposed on the gate lines 121a and 121b and the pixel electrode 191.

Semiconductors 154a and 154b including a hydrogenated amorphous silicon (a-Si) or a polycrystalline silicon (poly-Si) are disposed on the gate insulating layer 140.

Ohmic contacts 163b and 165b including a material such as n+ hydrogenated amorphous silicon in which an n-type impurity such as phosphorus is doped with a high density, or include a silicide, are disposed on the semiconductor 154b. The ohmic contacts 163b and 165b are positioned as a pair on the semiconductor 154b. In an exemplary embodiment, ohmic contacts may be positioned as a pair on the semiconductor 154a.

A data conductor including a plurality of data lines 171 and a plurality of drain electrodes 175a and 175b and a plurality of common voltage lines 172 are disposed on the ohmic contacts 163a, 163b, 165a, and 165b.

In an exemplary embodiment, the pixel electrode 191 includes a first pixel electrode 191a disposed on a left side of a common voltage line 172 and a second pixel electrode 191b disposed on a right side of the common voltage line 172.

The data line 171 positioned between a pair of adjacent pixel electrodes 191 transmits the data signal and substantially extends in a column direction thereby intersecting the gate lines 121a and 121b. The data line 171 includes end portions (not shown) for connection with another layer or an external driving circuit.

The data line 171 includes source electrodes 173a and 173b. The drain electrodes 175a and 175b include an expansion for connection with the pixel electrode 191, one end of the drain electrodes 175a and 175b face the source electrodes 173a and 173b, respectively, and the other end of the drain electrodes 175a and 175b overlaps the portion of the gate lines 121a and 121b, respectively, or the expansion 125.

The gate electrode 124a/124b, the source electrode 173a/173b, and the drain electrode 175a/175b provide a thin film transistor ("TFT") along with the semiconductor 154a/154b, and the channel of the TFT is provided in the semiconductor 154a/154b between the source electrode 173a/173b and the drain electrode 175a/175b. Because the TFT is provided, the lower panel 100 is also referred to as a TFT array panel.

A common voltage line 172 is positioned between adjacent pixel electrodes 191, but is positioned between pixel electrodes 191 which are not provided with the data line 171 and transmits the common voltage. The common voltage line 172 may be provided with the same layer and the same material as the data line 171. In an exemplary embodiment, the common voltage line 172 may be disposed in and/or on the same layer and the same material as the data line 171. The common voltage line 172 substantially extends in the column direction thereby intersecting the gate lines 121a and 121b, but it is disconnected at the portion where the gate lines 121a and 121b are positioned. That is, when the TFT (or the source electrodes 173a and 173b or the drain electrodes 175a and 175b of the TFT) are positioned where the common voltage line 172 will be provided in the column direction, the common voltage line 172 is disconnected not to overlap the source electrode and/or the drain electrode of the TFT.

Figure 8:
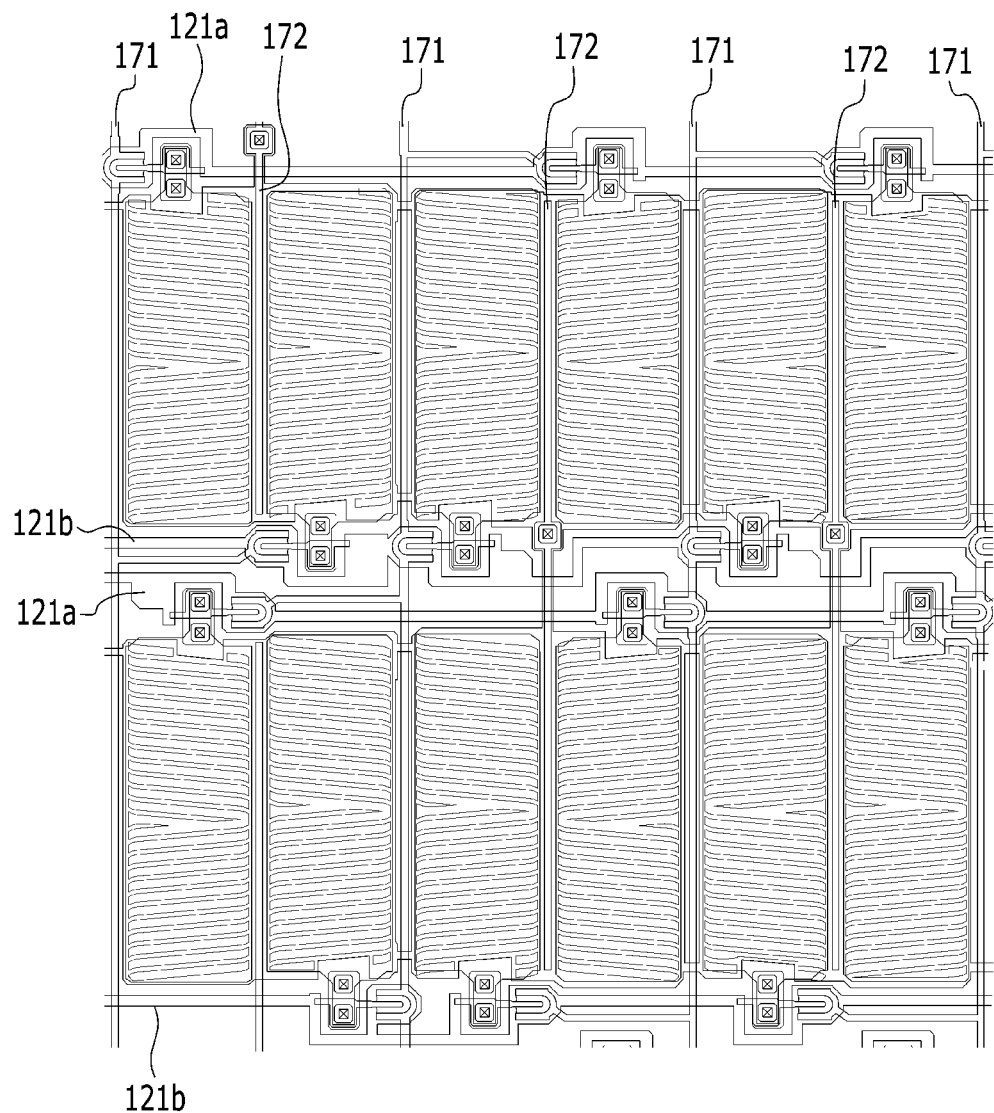
FIG. 8 is a plan view of an exemplary embodiment of a repetition unit of a pixel in an LCD according to the invention.

Particularly, referring to FIG. 8, with respect to two gate lines 121b and 121a between the upper pixel row and the lower pixel row, the first common voltage line 172 passes the gate lines 121b and 121a and is disconnected at the portion where two transistors are provided in the left side, but the second and third common voltage lines 172 are not disconnected, and they intersect the gate lines 121b and 121a and extend in the lower pixel row at the left side. Instead, the first common voltage line 172 is not disconnected and intersects the gate line between the upper pixel row and the pixel row disposed directly thereon and the lower pixel row and the pixel row disposed directly thereunder at the left side. Also, at the left side, the third and fourth common voltage lines 172 are disconnected between the upper pixel row and the pixel row disposed directly thereon and the lower pixel row and the pixel row disposed directly thereunder.

A passivation layer 180 is disposed on the data conductors 171, 173a, 173b, 175a, and 175b, the common voltage lines 172, the gate insulating layer 140, the exposed portion of the semiconductors 154a and 154b, and the pixel electrode 191.

A contact hole 185a exposing the drain electrodes 175a and 175b, a contact hole 185b exposing the pixel electrode 191, and a contact hole 186 exposing the common voltage line 172 are defined in the passivation layer 180. The drain electrodes 175a and 175b and the pixel electrode 191 are electrically connected to each other through the contact holes 185a and 185b by a connecting member 195.

A common electrode 270 is disposed on the passivation layer 180. A plurality of cutouts 71 is defined in the common electrode 270, and a plurality of branch electrodes 271 is defined by the plurality of cutouts 71. In the drawing, the cutouts 71 and the branch electrodes 271 are substantially provided in the horizontal direction in a plan view, but they may be substantially provided in the vertical direction.

The common electrode 270 includes a transverse connection 272 extended in a first (longitudinal) direction and a longitudinal connection 273 extended in a second (transverse) direction crossing the first direction, and the common electrodes 270 positioned in the left and right adjacent pixels are connected to each other through the connections 272 and 273. The transverse connection 272 of the common electrode 270 is positioned on the data line 171, and the longitudinal connection 273 of the common electrode 270 is positioned on the common voltage line 172. The common electrodes 270 positioned in the left and right adjacent pixels via the data line 171 are connected by the transverse connection 272, and the common electrodes 270 positioned in the left and right adjacent pixels via the common voltage line 172 are connected by the longitudinal connection 273.

The longitudinal connection 273 of the common electrode 270 may be connected to an expansion 72 of the common voltage line 172 through the contact hole 186 of the passivation layer 180. In an exemplary embodiment, four pixels are positioned around one contact hole 186. That is, the common electrode contact may be provided for four pixels.

The common electrodes 270 of the adjacent pixels are connected by the transverse connection 272 and the longitudinal connection 273 such that the common electrode 270 is connected on an entire surface of the LCD panel through networking. Accordingly, although the common voltage line 172 is disconnected at the position where it meets the TFT, the common voltage may be applied to the entire LCD panel.

Although not shown, an alignment layer may be coated on the common electrode 270 and the passivation layer 180, and the alignment layer may be a horizontal alignment layer and may be rubbed in a predetermined direction. However, when necessary, the alignment layer may include a photo-reactive material to be photo-aligned.

Next, the upper panel 200 will be described.

A light blocking member 220 is disposed on a second substrate 210. A color filter 230 is disposed on the second substrate 210. In another exemplary embodiment, the color filter 230 may be disposed on the lower panel 100, and the light blocking member 220 may also be disposed on the lower panel 100.

An overcoat 250 including an organic insulator to provide a flat surface is disposed on the color filter 230 and the light blocking member 220. In another exemplary embodiment, the overcoat 250 may be omitted, and an alignment layer may be disposed on the overcoat 250.

The liquid crystal layer 3 includes a liquid crystal material having negative dielectric anisotropy or positive dielectric anisotropy. Liquid crystal molecules of the liquid crystal layer 3 are arranged such that a long axis direction thereof is aligned to be parallel to the display panels 100 and 200, and they may be disposed to have a pretilt angle in the rubbing direction of the alignment layer.

In the LCD according to the exemplary embodiment, the pixel electrode 191 has a plane shape entirely provided in each pixel area and the common electrode 270 has a plurality of branch electrodes 271, but in the LCD according to another exemplary embodiment of the invention, the common electrode 270 may have a plane shape entirely provided in each pixel area and the pixel electrode may have a plurality of branch electrodes defined by the cutouts.

Referring to FIGS. 3 and 6, the contact hole 186 provided in the passivation layer 180 to connect the expansion 72 of the common voltage line 172, and the longitudinal connection 273 of the common electrode 270 is positioned between the adjacent pixel electrodes 191. Accordingly, the aperture ratio deterioration by the contact hole 186 for the connection of the common voltage line 172 and the common electrode 270 may be effectively prevented.

In general, to effectively prevent light leakage by misalignment between the light blocking member 220 provided in the upper panel 200 and the pixel electrode 191 provided in the lower panel 100, a width of the light blocking member 220 is increased by a misalignment error tolerance. However, according to the LCD according to the exemplary embodiment, the common voltage line 172 is positioned between the two adjacent pixel electrodes 191. Accordingly, the light leakage generated between two adjacent pixel electrodes 191 may be effectively prevented, and thereby the width of the light blocking member 220 provided between the two adjacent pixel electrodes 191 may be effectively reduced, and resultantly, the aperture ratio of the LCD may be increased. Accordingly, while the signal delay of the common voltage applied to the common electrode 270 of the LCD is effectively reduced, the aperture ratio deterioration of the LCD may be effectively prevented.

FIG. 8 showing the repetition unit of the pixel also shows the connection relationship between the data line and the pixel electrode to which the data voltage of each data line 171 is applied. The data voltage of the first data line 171 (i.e., the leftmost data line) is applied to two adjacent pixels on the right side of the corresponding data line of the upper pixel row through the upper side and the lower side (sequentially from the left side), respectively. The data voltage of the second and third data lines 171 is applied to two adjacent pixels on the right side of the corresponding data line of the upper pixel row through the lower side and the upper side (sequentially from the left side), respectively, and is applied to two adjacent pixels on the left side of the corresponding data line of the lower pixel row through the upper side and the lower side (sequentially from the left side). The data voltage of the fourth data line 171 is applied to two pixels adjacent to the left side of the corresponding data line in the lower pixel row through the upper side and the lower side. Although not shown, the repetition unit of the pixel is repeated throughout all pixels of the LCD panel such that the data voltage of the fourth data line 171 is applied to two pixels adjacent to the right side of the corresponding data line of the upper pixel row through the upper side and the lower side.

Figure 9:
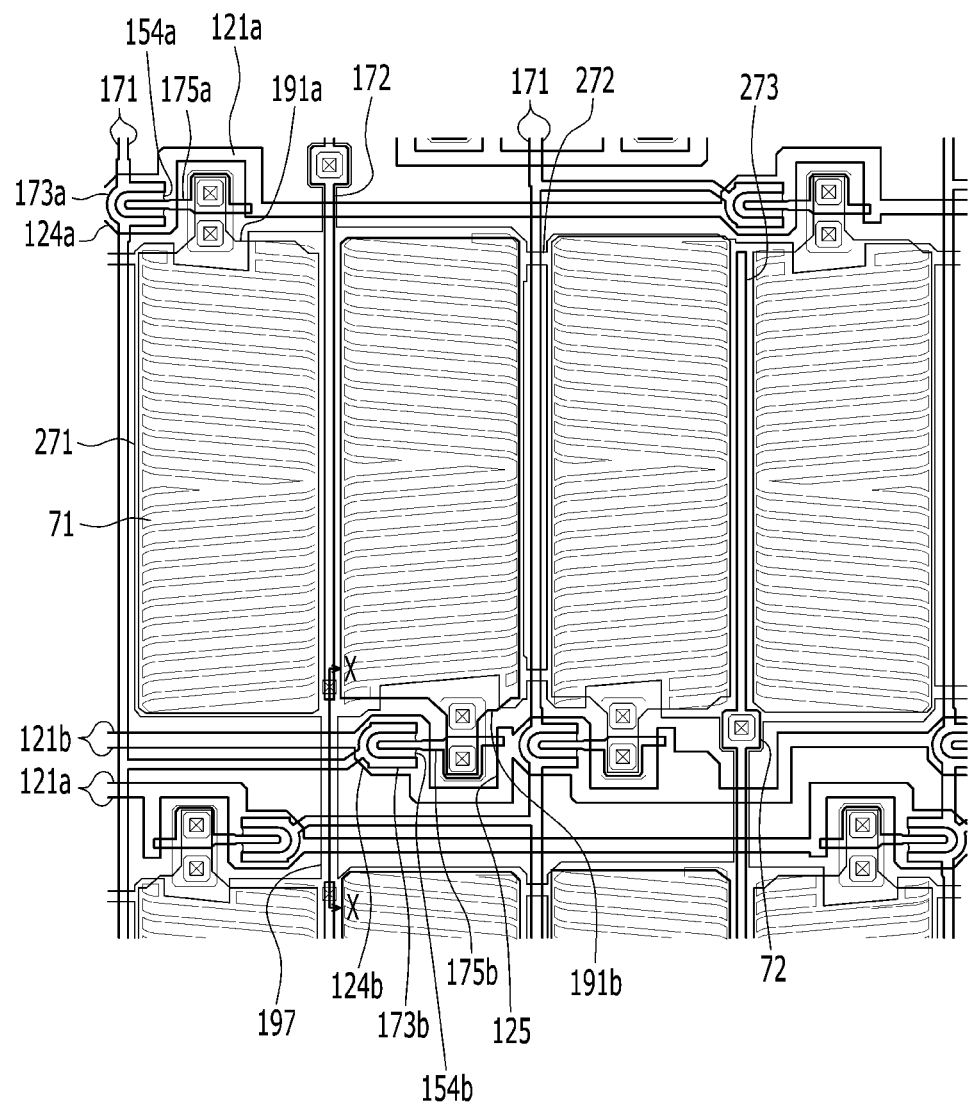
FIG. 9 is a plan view of another exemplary embodiment of a pixel in an LCD according to the invention.
Figure 10:
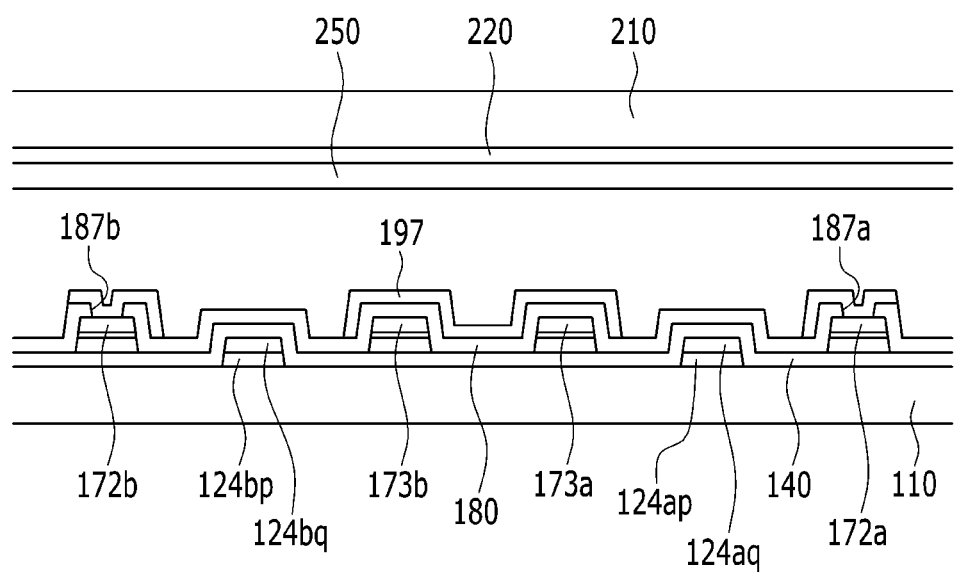
FIG. 10 is a cross-sectional view of the LCD of FIG. 9 taken along line X-X.

FIG. 9 is a plan view of a pixel in an LCD according to another exemplary embodiment of the invention, and FIG. 10 is a cross-sectional view of the LCD of FIG. 9 taken along line X-X.

The exemplary embodiment is similar to the described exemplary embodiment, but the common voltage line 172 disconnected near the TFT is connected though a connecting member 197. Differences from the described exemplary embodiment will be mainly described and the same description is omitted.

For the electrical connection of the common voltage line 172*b* that is disconnected in the approximately lower end of the upper pixel row and the common voltage line 172*a* that is again started in the approximately upper end of the lower pixel row, contact holes 187*b* and 187*a* exposing common voltage lines 172*b* and 172*a* disposed in each pixel row side are defined in the passivation layer 180. A connecting member 197 to electrically connect the common voltage line 172*b* and the common voltage line 172*a* is disposed on the contact holes 187*b* and 187*a* and the passivation layer 180 with approximately the same thickness as the longitudinal connection 273 of the common electrode 270. Through this connection, the common voltage lines 172 are substantially and continuously connected in the entire column direction. Nevertheless, the connecting member 197 of the transistor is provided via the passivation layer 180 of the insulating layer for the source electrode 173*b* and 173*a* such that a short-circuit is not generated.

The contact holes 187*b* and 187*a* of the common voltage lines 172*b* and 172*a* may be provided together when providing the described contact hole 186 exposing the common voltage line 172 and electrically connecting the common voltage line 172 and the common electrode 270. Also, the connecting member 197 may include the same material as the common electrode 270 when providing the common electrode 270 on the passivation layer 180, and for example, a material such as ITO and IZO may be used. Accordingly, an additional process or an additional mask for the connection of the common voltage lines 172*b* and 172*a* is not used.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A liquid crystal display comprising:
a plurality of pixels which is disposed in row and column directions and respectively includes a plurality of pixel electrodes, the plurality of pixel electrodes arranged in a first pixel column to a sixth pixel column;
a plurality of gate lines extending in the row direction, and including pairs of adjacent gate lines respectively corresponding to one pixel row;
a plurality of data lines extending in the column direction, and including:
a first data line at a left side of the first pixel column,
a second data line between the second and third pixel columns,
a third data line between the fourth and fifth pixel columns, and
a fourth data line at a right side of the sixth pixel column; and
a plurality of common voltage lines extending in the column direction, and including:
a first common voltage line between the first and second pixel columns,
a second common voltage line between the third and fourth pixel columns, and
a third common voltage line between the fifth and sixth pixel columns, wherein
each data line of the plurality of data lines
is connected to two pixel electrodes adjacent in the row direction among the plurality of pixel electrodes on a first side of the data line, in an odd-numbered pixel row, and
is connected to two pixel electrodes adjacent in the row direction among the plurality of pixel electrodes on a second side opposing the first side of the data line, in an even-numbered pixel row directly adjacent to the odd-numbered pixel row,
the first common voltage line is disconnected between the odd-numbered pixel row and the even-numbered pixel row disposed directly thereunder, in the column direction, and
the second and third common voltage lines are disconnected between the even-numbered pixel row and another odd-numbered pixel row disposed directly thereunder, in the column direction.

2. The liquid crystal display of claim 1, wherein
the plurality of data lines and the plurality of common voltage lines are positioned in a same layer and include a same material.

3. The liquid crystal display of claim 1, wherein
the plurality of pixels further includes a switching element respectively connected to the plurality of pixel electrodes,
the switching element is positioned between the pixel rows at which a common voltage line of the plurality of common voltage lines is disconnected, and
the switching element crosses an imaginary extension line of the disconnected common voltage line.

4. The liquid crystal display of claim 3, wherein
two switching elements are positioned between the pixel rows at which the common voltage line is disconnected.

5. The liquid crystal display of claim 3, wherein
the switching element is included in the pixel electrode positioned relatively far from a data line of the plurality of data lines among two pixel electrodes in a pixel row of the plurality of pixel rows connected to the data line,
the switching element is connected to the pixel electrode further from the data line among the two adjacent pixel electrodes connected to the data line for the respective pixel row.

6. The liquid crystal display of claim 1, wherein
the plurality of pixels further comprises:
- a plurality of common electrodes respectively overlapping the plurality of pixel electrodes, and
- an insulating layer between the common and pixel electrodes, and the plurality of gate lines, the plurality of data lines, the plurality of common voltage lines, the plurality of pixel electrodes and the plurality of common electrodes are on a same substrate.

7. The liquid crystal display of claim 6,
further comprising a common electrode transverse connection and a common electrode longitudinal connection in a same layer as the common electrodes,
wherein common electrodes adjacent in the row direction are connected to each other by the common electrode transverse and longitudinal connections.

8. The liquid crystal display of claim 7, wherein
the common electrode transverse connection crosses the data line of the plurality of data lines, and connects the common electrodes adjacent in the row direction and respectively positioned at the first and second sides of the data line, and
the common electrode longitudinal connection overlaps a common voltage line of the plurality of common voltage lines, and connects the common electrodes adjacent in the row direction and respectively positioned at opposing sides of the common voltage line.

9. The liquid crystal display of claim 1, wherein:
the plurality of pixels further includes a plurality of first switching elements which is respectively connected to the plurality of pixel electrodes of the odd-numbered pixel row, is positioned at a left upper side, a left lower side, a left lower side, a left upper side, a left lower side and a left upper side of the plurality of pixel electrodes in the first to sixth pixel columns of the odd-numbered pixel row, and is repeated in the row direction; and
the plurality of pixels further includes a plurality of second switching elements which is respectively connected to the plurality of pixel electrodes of the even-numbered pixel row, is positioned in a right upper side, a right lower side, a right lower side, a right upper side, a right lower side and a right upper side of the plurality of pixel electrodes in the first to sixth pixel columns of the even-numbered pixel row, and is repeated in the row direction.

10. The liquid crystal display of claim 1, wherein:
in the odd-numbered pixel row, the two pixel electrodes adjacent to each other provide a pair of pixel electrodes and are connected to the data line positioned at a left or a right side thereof; and
in the even-numbered pixel row, the two pixel electrodes adjacent to each other provide a pair of pixel electrodes and are connected to the data line positioned at the right or left side thereof, respectively.

11. The liquid crystal display of claim 10, wherein
in the odd-numbered pixel row,
the first and fourth data lines are connected to the pixel electrode closer thereto among the two adjacent pixel electrodes connected thereto, at an upper side of the pixel electrode, and are connected to the pixel electrode farther therefrom among the two adjacent pixel electrodes connected thereto, at a lower side of the pixel electrode,
the second and third data lines are connected to the pixel electrode closer thereto among the two adjacent pixel electrodes connected thereto, at the lower side of the pixel electrode, and are connected to the pixel electrode farther therefrom among the two adjacent pixel electrodes connected thereto, at the upper side of the pixel electrode, and
these connections are repeated in the row direction.

12. The liquid crystal display of claim 11, wherein
in the even-numbered pixel row,
the second data line is connected to the pixel electrode closer thereto among the two adjacent pixel electrodes connected thereto, at the lower side of the pixel electrode, and is connected to the electrode farther therefrom among the two adjacent pixel electrodes connected thereto, at the upper side of the pixel electrode,
the third and fourth data lines are connected to the pixel electrode closer thereto among the two adjacent pixel electrodes connected thereto, at the upper side of the pixel electrode, and are connected to the pixel electrode farther therefrom among the two adjacent pixel electrodes connected thereto, at the lower side of the pixel electrode, and
these connections are repeated in the row direction.

13. The liquid crystal display of claim 1, wherein
disconnected portions of the plurality of common voltage lines are connected to each other by a connecting member in a different layer than the plurality of common voltage lines.

14. The liquid crystal display of claim 13, further comprising a passivation layer,
wherein
the plurality of pixels further includes a switching element respectively connected to the plurality of pixel electrodes, and
the connecting member overlaps the switching element and the plurality of gate lines via the passivation layer.

15. The liquid crystal display of claim 14, further comprising:
a common electrode which overlaps the plurality of pixel electrodes,
wherein
the connecting member includes a same material as that of the common electrode.

* * * * *